United States Patent
Boeszoermenyi et al.

(10) Patent No.: US 9,118,627 B2
(45) Date of Patent: Aug. 25, 2015

(54) METHOD, APPARATUS AND COMPUTER PROGRAM PRODUCT FOR IMPROVING RESOURCE RESERVATION IN SESSION INITIATION

(75) Inventors: Adam Boeszoermenyi, Zurndorf (AT); Karl Lanzinger, München (DE)

(73) Assignee: Nokia Solutions and Networks Oy, Espoo (FI)

( * ) Notice: Subject to any disclaimer, the term of this patent is extended or adjusted under 35 U.S.C. 154(b) by 139 days.

(21) Appl. No.: 13/263,406

(22) PCT Filed: Apr. 9, 2009

(86) PCT No.: PCT/EP2009/054283
§ 371 (c)(1),
(2), (4) Date: Oct. 17, 2011

(87) PCT Pub. No.: WO2010/115466
PCT Pub. Date: Oct. 14, 2010

(65) Prior Publication Data
US 2012/0042085 A1   Feb. 16, 2012

(51) Int. Cl.
*G06F 15/16* (2006.01)
*H04L 29/06* (2006.01)

(52) U.S. Cl.
CPC .............. *H04L 63/029* (2013.01); *H04L 65/80* (2013.01); *H04L 63/12* (2013.01); *H04L 63/168* (2013.01); *H04L 65/1069* (2013.01)

(58) Field of Classification Search
CPC ............ H04L 61/1529; H04L 61/3085; H04L 61/309; H04L 61/2564; H04L 65/1006; H04L 9/32
See application file for complete search history.

(56) References Cited

U.S. PATENT DOCUMENTS

| | | | |
|---|---|---|---|
| 7,127,610 B1* | 10/2006 | Li et al. | 713/163 |
| 8,050,684 B2* | 11/2011 | Lewis et al. | 455/445 |
| 8,134,956 B2* | 3/2012 | Siegel et al. | 370/328 |
| 8,379,655 B2* | 2/2013 | Torres et al. | 370/401 |
| 2005/0165917 A1* | 7/2005 | Le et al. | 709/220 |
| 2008/0155658 A1* | 6/2008 | Leinonen et al. | 726/4 |
| 2008/0311884 A1* | 12/2008 | Ala-Laurila et al. | 455/406 |
| 2009/0157799 A1* | 6/2009 | Sukumaran et al. | 709/203 |
| 2009/0254761 A1* | 10/2009 | Thiebeauld De La Crouee et al. | 713/193 |
| 2011/0145409 A1* | 6/2011 | Mulligan et al. | 709/225 |

OTHER PUBLICATIONS

TD S2-092028, 3GPP TSG SA WG2 Meeting #72, "Editorial Corrections to TR 23.848", Mar. 30-Apr. 3, 2009, Hangzhou, China, 12 pgs.

(Continued)

*Primary Examiner* — Dhairya A Patel
(74) *Attorney, Agent, or Firm* — Harrington & Smith

(57) ABSTRACT

There are provided measures for resource reservation improvement in session initiation. Such measures for resource reservation improvement may for example comprise receiving a session initiation request of a user, determining an authentication type of the user, detecting, in the received session initiation request, an absence of authentication data required for an authentication in accordance with the determined authentication type of the user, and preventing a resource reservation for the requested session initiation.

21 Claims, 6 Drawing Sheets

(56) References Cited

OTHER PUBLICATIONS

3GPP TS 23.506 V8.1.0 (Sep. 2008), "3rd Generation Partnership Project; Technical specification Group Technical Specification Group Services and System Aspects; Telecommunications and Internet converged Services and Protocols for Advanced Networking (TISPAN); IP Multimedia Subsystem (IMS); Stage 2 description [3GPP TS 23.228 Release 7, modified] (Release 8)", 20 pgs.

RFC4740, Garcia-Martin, M., et al., "Diameter Session Initiation Protocol (SIP) Application", © The IETF Trust, 2006, 72 pgs.

3GPP TS 24.229 V8.7.0 (Mar. 2009), Technical Specification, 3rd I Generation Partnership Project; Technical Specification Group Core Network and Terminals; IP Multimedia Call Control Protocol Based on Session Initiation Protocol (SDP); Stage 3 (Release 8), (618 pages).

Rosenberg, et al., "SIP: Session Initiation Protocol", (Oct. 2008), (236 pages).

* cited by examiner

METHOD, APPARATUS AND COMPUTER PROGRAM PRODUCT FOR IMPROVING RESOURCE RESERVATION IN SESSION INITIATION

TECHNICAL FIELD

The present invention generally relates to a resource reservation improvement in session initiation. For example, the present invention may be applicable to a performance improvement in session control for initiating multimedia sessions.

BACKGROUND

In modern and future communication networks including fixed an mobile telecommunication networks (such as for example Internet Protocol-based networks, Global System for Mobile Communication (GSM), General Packet Radio Service (GPRS), Universal Mobile Telecommunication System (UMTS), Long-Term Evolution (LTE) or the like) the provision of services to users plays an important role. Therefore, the aim to enable the delivery of any service to any user over any network has lead to the development of service network architectures. One example is the IP (Internet Protocol) multimedia subsystem (IMS). The IP multimedia subsystem has been defined both by 3GPP (3GPP: Third Generation Partnership Project) and ETSI TISPAN (ETSI: European Telecommunication Standard Institute, TISPAN: Telecommunications and Internet converged Services and Protocols for Advanced Networking).

Although IMS is taken as a non-limiting example in the subsequent description, it is to be noted that the below description equally applies to any other network or system having comparable properties.

In an IMS environment, a user or client needs to register and establish a session with the IMS system in order get access to services. A session initiation between a user or client and the IMS system is commonly achieved by using SIP (Session Initiation Protocol) as a signaling protocol. A logical function for handling session initiation on both control and user plane at the side of the IMS system may be referred to as session border control (SBC) functionality. It is noted that a SBC may have other functions as well, while in the following the handling of session initiation is basically referred to only.

FIG. 1 shows a schematic block diagram of a logical architecture and interfaces of a (decomposed) session border control functionality according to TIPSAN.

In the TISPAN IMS architecture, as depicted in FIG. 1, the first access point of a user or user equipment UE is a P-CSCF element (Proxy Call Session Control Function). The P-CSCF element has a Diameter-based interface to a SPDF element (Service Policy Decision Function), and the SPDF element has an interface based on H.248 to a BGF (Border Gateway Function) representing an IP-IP gateway element.

In the logical architecture according to FIG. 1, it is assumed as an example that the SBC function is decomposed such that a controller is realized by an Application Function AF (represented by the P-CSCF in FIG. 1) and the SPDF, and a border gateway is realized by the BGF. However, it is to be noted that the SBC function may equally well be implemented as a standalone unit, or (according to 3GPP) the SBC function may be implemented completely in the P-CSCF directly (i.e. without an intermediate SPDF) controlling an access gateway (referred to as A-BGF).

In the logical architecture according to FIG. 1, resource reservation for session initiation is performed between the thus depicted elements so as to control a quality of service (QoS) of the user's session and to control a session border control functionality. This SBC functionality forces a media stream of the user's session via pinholes of the gateway element, such pinholes representing reserved traffic resources.

Referring to FIG. 1, by way of example, these pinholes are allocated by Gq' commands from the P-CSCF to the SPDF and by H.248 commands from the SPDF to the BGF. The P-CSCF informs the SPDF via the Gq' interface about any changes in a session description which may be received in a SIP message's content in accordance with a Session Description Protocol (SDP), in this case in a SDP offer. The SPDF controls the IP-IP gateway BGF via the H.248 protocol, and after the corresponding BGF response the SPDF replies to the P-CSCF. When the Gq' interface interaction is finished, the P-CSCF forwards the SIP request towards the next entity, namely an IMS S-CSCF (Serving Call Session Control Function) in the uplink direction, or to the user equipment UE in the downlink direction. The allocated pinhole will be updated and/or removed in a similar way, if the P-CSCF receives a response to the initial request with a SDP answer. Such pinhole allocation is indicated in FIG. 2.

FIG. 2 shows a schematic illustration of a call flow for session initiation in the logical architecture of FIG. 1. In the thus depicted call flow, a SIP INVITE message is assumed, in which "A" exemplarily represents a remote address of an offering user equipment within a SDP offer.

The values in the table of FIG. 2 represent remote and local bindings (address and port information) in the H.248 context, which are used for a symmetric payload transmission. The BGF is mapping the "A" address:port indicated in the SDP context of the SIP request to the "A'" address:port, which is only visible from the core network side.

In session initiation, it has also to be ensured that a user requesting a session initiation is authenticated.

IMS clients or users may be connected to the IMS system via several kinds of access networks, e.g. mobile, DSL (Digital Subscriber Line), cable, etc. For connection via different access networks, different authentication schemes may be usable. Such different authentication schemes may be based on different principles, such as e.g. the user authenticating himself towards the network, the network challenging the user, etc.

For example, for IMS clients connected via a fixed network the caching of credentials across dialogs for the same realm (IMS provider) is allowed, which means that the user will authenticate himself towards the network for session setups without being challenged by the IMS, but this behavior is not mandatory. Many clients do not follow this procedure. As a consequence, the resources in an integrated SBC element (as depicted in FIG. 1) will be reserved in the uplink direction and subsequently released in each session setup procedure, if the IMS client does not send required authentication data or credentials in an initial session initiation request and will be challenged by the S-CSCF, even if the media stream is not established. The S-CSCF might in any case require authentication data or credentials for the requests initiated by the IMS users using certain authentication schemes at registration.

Accordingly, when the initial request does not contain such required authentication data or credentials, the IMS clients may only authenticate themselves at the second session initiation trial using the received authentication challenge from the network side. The media stream will then be established to the terminating user, if all other prerequisites of the session setup are fulfilled.

FIG. 3 shows a signaling diagram of a session initiation call with failed authentication, as outlined above.

The session initiation call flow according to FIG. 3 shows the start of a session setup on the originating side. The first SIP INVITE message from the user equipment UE leads to the allocation of a pinhole in the BGF. This results in the exchange of five messages on the Gq' and H.248 interfaces, namely AAR, ADD, ADD Reply, ADD Ack and AAA (AAR: Authentication-Authorization-Request, AAA: Authentication-Authorization-Answer, ADD: Addition request for pinhole resource). However, since the SIP INVITE message has been sent without authentication data or credentials, which is assumed to be required in the authentication of the requesting user, the thus requested session initiation may not be successful. Rather, the SIP INVITE message gets challenged with a negative SIP response message (denoted as "407 Auth Required"), and thus the recently allocated pinhole must be removed again. This results in the exchange of another five messages on the Gq' and H.248 interfaces, namely STR, SUBTRACT, SUBTRACT Reply, SUBTRACT Ack and STA (STR: Session-Termination-Request, STA: Session-Termination-Answer, SUBTRACT: Subtraction request for pinhole resource). The following SIP INVITE message from the user equipment UE, which now contains authentication data or credentials in response to the challenge in the preceding negative SIP response, again leads to a pinhole allocation in the BGF. This results in the exchange of another five messages on the Gq' and H.248 interfaces, which are similar to those exchanged upon the first SIP INVITE message. Thereby, the requested session is eventually initiated.

Accordingly, pinholes are allocated at first, even if the session setup will be cancelled again immediately.

In view of the above, it is evident that 10 out of 15 Gq' and H.248 messages in the processing during session initiation with a failed first authentication trial are superfluous on the originating side. The terminating side session initiation is not affected by the overhead caused by the authentication challenge.

Hence, present techniques may easily lead to an excessive usage of resources in connection with a failed authentication in session initiation. This leads to performance degradation both in terms of resource occupancy and time delay due to an undue number of transactions on the signaling interfaces in session border control. However, the session border control function does not have any (standardized) means or processes for avoiding such a superfluous message exchange in the processing during session initiation with a failed authentication.

Accordingly, there does not exist any feasible solution for an improved resource reservation in session initiation.

SUMMARY OF EXEMPLARY EMBODIMENTS OF THE INVENTION

The present invention and its embodiments are made to provide for a feasible solution for an improved resource reservation in session initiation.

According to an exemplary first aspect of the present invention, there is provided a method comprising receiving a session initiation request of a user, determining an authentication type of the user, detecting, in the received session initiation request, an absence of authentication data required for an authentication in accordance with the determined authentication type of the user, and preventing a resource reservation for the requested session initiation.

According to further developments or modifications thereof, one or more of the following applies:
the method further comprises replacing a connection address in the session initiation request with a null address, and forwarding the session initiation request with the null address to a session initiation element,
the preventing a resource reservation comprises skipping a resource reservation procedure with a gateway function,
the resource reservation comprises allocating and/or removing traffic pinholes at said gateway function,
the determining an authentication type of the user comprises storing an authentication type parameter indicating a specific authentication type in conjunction with user registration data of the user, and checking, when retrieving the user registration data of the user, whether or not the authentication type parameter is present,
the method further comprises receiving the authentication type parameter indicating a specific authentication type in a session registration message from a session initiation element,
the method further comprises receiving, responsive to the session initiation request, a session initiation response from a session initiation element, and initiating a session release procedure, when the received session initiation response is positive, or forwarding the received session initiation response together with an authentication challenge to the user, when the received session initiation response is negative,
the session initiation request comprises an invite message in accordance with a session initiation protocol with or without session description information in accordance with a session description protocol,
when the authentication type is determined to be HTTP digest authentication or a user challenging using a Proxy-Authorization header, the authentication data to be detected is a Proxy-Authorization header in the session initiation request,
the user is a client of an IP multimedia subsystem requesting a session towards said IP multimedia subsystem, and/or
the method is operable at a proxy call state control function of an IP multimedia subsystem.

According to an exemplary second aspect of the present invention, there is provided an apparatus comprising a transceiver configured to receive a session initiation request of a user, an authentication type processor configured to determine an authentication type of the user, an authentication data processor configured to detect, in the received session initiation request, an absence of authentication data required for an authentication in accordance with the determined authentication type of the user, and a session initiation processor configured to prevent a resource reservation for the requested session initiation.

According to further developments or modifications thereof, one or more of the following applies:
the session initiation processor is configured to replace a connection address in the session initiation request with a null address, and the transceiver is configured to forward the session initiation request with the null address to a session initiation element,
the session initiation processor is configured to skip a resource reservation procedure with a gateway function,
the resource reservation comprises allocating and/or removing traffic pinholes at said gateway function,
the authentication type processor is configured to store an authentication type parameter indicating a specific authentication type in conjunction with user registration data of the user, and check, when retrieving the user registration data of the user, whether or not the authentication type parameter is present, the transceiver is configured to receive the authentication type parameter indicating a specific authentication type in a session registration message from a session initiation element, the transceiver is configured to receive, responsive to the session initiation request, a session initiation response from a session initiation element, and the session initiation processor is configured to initiate a session release procedure, when the received session initiation response is positive, or to forward the received session initiation response together with an authentication challenge to the user, when the received session initiation response is negative, the session initiation request comprises an invite message in accordance with a session initiation protocol with or without session description information in accordance with a session description protocol, when the authentication type processor determines the authentication type to be HTTP digest authentication or a user challenging using a Proxy-Authorization header, the authentication data processor is configured to detect a Proxy-Authorization header in the session initiation request as the authentication data, the user is a client of an IP multimedia subsystem requesting a session towards said IP multimedia subsystem, and/or the apparatus is operable as a proxy call state control function of an IP multimedia subsystem.

According to an exemplary third aspect of the present invention, there is provided a computer program product comprising program code means being arranged, when run on a processor of an apparatus, to perform the method according to the first aspect and/or any one of its further developments or modifications.

According to a further development or modification thereof, the apparatus is operable as a proxy call state control function of an IP multimedia subsystem.

By way of exemplary embodiments of the present invention, there is provided an improved resource reservation in session initiation. Stated in other words, a resource usage of a session setup may be improved, which improvement is for example applicable to a performance improvement in session control for initiating multimedia sessions e.g. in an (3GPP and/or TISPAN) IMS system.

By way of exemplary embodiments of the present invention, superfluous resource reservations (e.g. pinhole allocations) may be avoided, and accordingly the need for multiple resource reservations and releases (e.g. pinhole allocations and removals) in connection with a failed authentication in session initiation may be avoided.

BRIEF DESCRIPTION OF THE DRAWINGS

In the following, the present invention will be described in greater detail by way of non-limiting examples with reference to the accompanying drawings, in which.

DETAILED DESCRIPTION OF EXEMPLARY EMBODIMENTS OF THE INVENTION

The present invention is described herein with reference to particular non-limiting examples. A skilled person will appreciate that the invention is not limited to these examples, and may be more broadly applied.

In particular, the present invention and its embodiments are mainly described in relation to 3GPP or TISPAN specifications being used as non-limiting examples for certain exemplary network configurations. In particular, IMS is used as a non-limiting example of a system with which a session is to be initiated, and SIP and SDP are used as non-limiting examples of signaling protocols for session initiation. As such, the description of exemplary embodiments given herein specifically refers to terminology which is directly related thereto. Such terminology is only used in the context of the presented non-limiting examples, and does naturally not limit the invention in any way. Rather, any other system configuration or signaling protocol may also be utilized as long as compliant with the features described herein. In particular, embodiments of the present invention may be applicable in any session-based connection, especially in session-based connections with a resource reservation which is only valid within a particular session, i.e. where different sessions may not be associated with each other.

In the following, various embodiments and implementations of the present invention and its aspects or embodiments are described using several alternatives. It is generally to be noted that, according to certain needs and constraints, all of the described alternatives may be provided alone or in any conceivable combination (also including combinations of individual features of the various alternatives).

In the following, exemplary embodiments of the present invention are described with reference to methods, procedures and functions.

Figure 4:
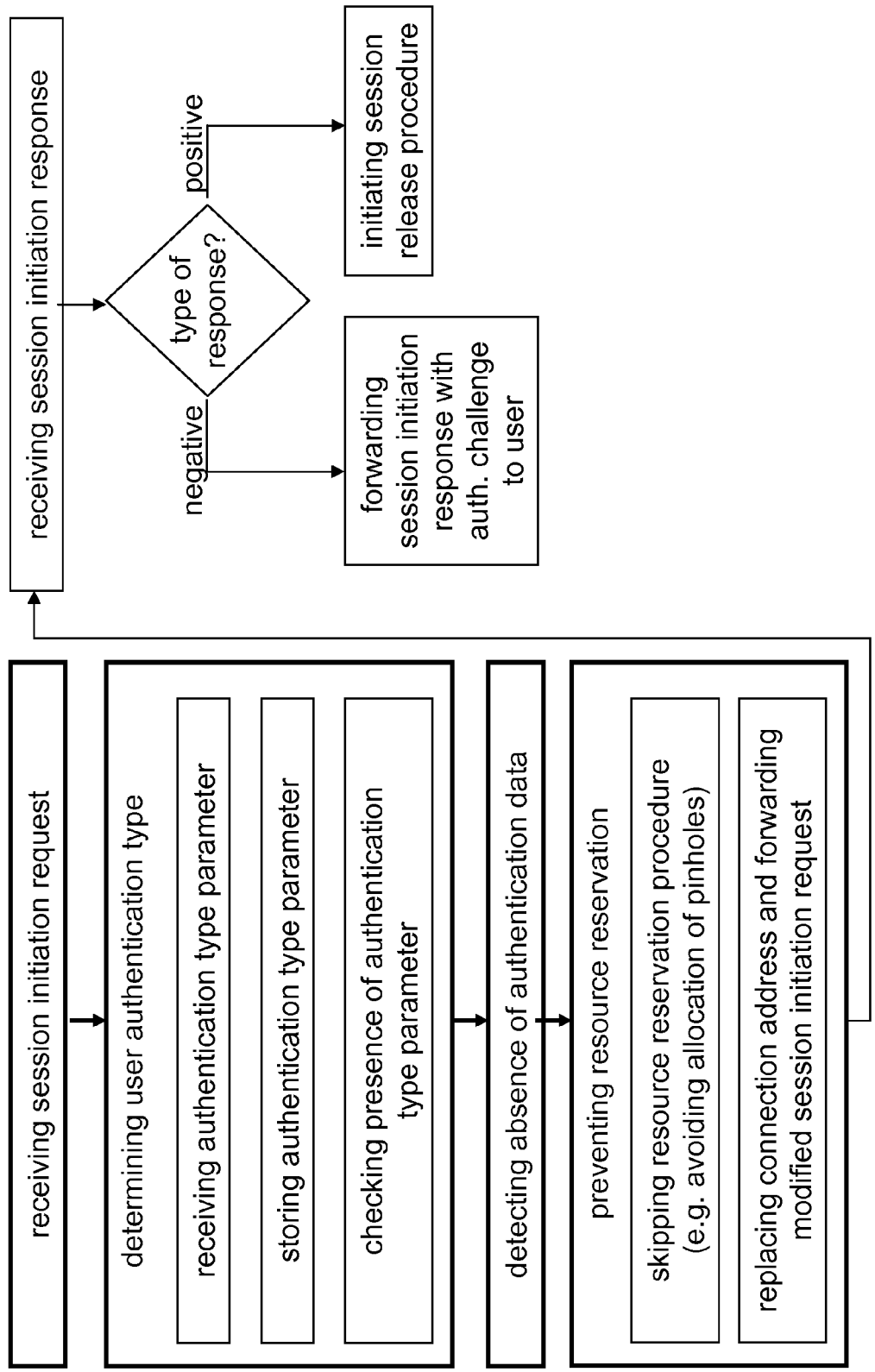
FIG. 4 shows a flow diagram of a method according to exemplary embodiments of the present invention.

FIG. 4 shows a flow diagram of a method according to exemplary embodiments of the present invention. The thus depicted method may be implemented to be carried out by or at a first access point of a requesting user in a service provisioning system, i.e. a proxy, for example a P-CSCF element in an IMS system.

According to the illustration of FIG. 4, basic operations of a method according to exemplary embodiments are depicted by thick line blocks, while detailed and/or optional operations of a method according to exemplary embodiments are depicted by thin line blocks. It is to be noted that the illustrated sequence of operations is not mandatory, e.g. the determining and detecting operations may equally be performed in an opposite order or simultaneously. It is also to be noted that any subset of detailed and/or optional operations is feasible to be performed, i.e. not all of the illustrated operations have to be performed at any instance.

As depicted in FIG. 4, a method according to exemplary embodiments of the present invention comprises the operations of receiving a session initiation request of a user, determining an authentication type of the user, detecting, in the received session initiation request, an absence of authentication data required for an authentication in accordance with the determined authentication type of the user, and preventing a resource reservation for the requested session initiation.

According to an exemplary implementation thereof, a method according to exemplary embodiments of the present invention comprises an operation of receiving a session initiation request of a user, which may be performed by a receiver or transceiver or accordingly adapted means of an executing apparatus such as e.g. a P-CSCF, an operation of determining an authentication type of the user, which may be performed by an authentication type processor or accordingly adapted means of an executing apparatus such as e.g. a P-CSCF, an operation of detecting, in the received session initiation request, an absence of authentication data required for an authentication in accordance with the determined authentication type of the user, which may be performed by an authentication data processor or accordingly adapted means of an executing apparatus such as e.g. a P-CSCF, and an operation of preventing a resource reservation for the requested session initiation, which may be performed by a session initiation processor or accordingly adapted means of an executing apparatus such as e.g. a P-CSCF.

In an operation of receiving a session initiation request, for example a SIP INVITE message may be received from a user or user equipment UE. Such a SIP INVITE message may contain a session description, for example by means of a SDP offer.

In an operation of determining an authentication type of the user, it may be detected whether or not the user has an authentication type which requires authentication data or credentials to be included in the session initiation request for enabling user authentication at the network side. A non-limiting example for such an authentication type/scheme includes HTTP digest authentication which requires a Proxy-Authorization header to be included e.g. in a SIP INVITE message as authentication data or credentials. For the sake of intelligibility, this non-limiting example is assumed for the subsequent description, however explicitly without limiting the thus described features to this non-limiting example which may only represent an exemplary and non-limiting implementation example.

According to an exemplary implementation, an authentication type determination may be accomplished by use of a parameter indicating a specific authentication type of a user. Such a parameter may be signaled to the executing apparatus such as a P-CSCF of an IMS system for example in a registration phase preceding a session initiation phase.

For example, when a user connects to an IMS system, the first procedure is a registration. The user sends a registration request such as for example a SIP REGISTER message, which goes via the P-CSCF to the S-CSCF. Since the P-CSCF has no explicit means to recognize the type of the authentication of the user. In this regard, the authentication type may comprise an authentication scheme and/or a required challenging of the user (or the type of user) for authentication, the S-CSCF checks the authentication type (e.g. authentication scheme and/or required challenging of the user (or the type of user) for authentication) and sends a corresponding indication in a response to the P-CSCF. A required challenging of the user (or the type of user) may comprise a need for such a challenging and/or particulars (e.g. parameters) thereof. As an example, the S-CSCF may inform the P-CSCF about the usage of HTTP digest authentication in a registration response such as for example a 200 OK message or in a SIP header, which is sent responsive to the SIP REGISTER message. As another example, the S-CSCF may inform the P-CSCF that the user to be registered is to be challenged for authentication and/or that the challenging is to be accomplished by way of the need for the user sending a Proxy-Authorization header in a session initiation request.

The S-CSCF may for example insert a parameter such as e.g. "auth-type=digest" into the Service-Route header in the 200 OK response, if a Proxy-Authorization header is required by the S-CSCF for authenticating/authorizing the initial INVITE request as long as the UE stays registered. Otherwise, the S-CSCF may not send this parameter in the 200 OK response, if it is configured (for other reason) not to challenge all initial INVITE requests without a Proxy-Authorization header, received from the particular client/user.

Accordingly, in the present example of using a dedicated authentication type parameter, the S-CSCF is configured to find out the type of registration and signal this finding to the proxy P-CSCF. The registration type information signaled back to the P-CSCF may be used for different purposes. In the present case, the information may also be loaded with a confirmation of the challenging of unauthorized requests.

Following such procedure, i.e. by receiving a respective indication for example in the form of a specific authentication type parameter, the P-CSCF may learn unambiguously the usage of HTTP digest authentication for the subsequent requests from the particular client.

When receiving such specific authentication type parameter, the P-CSCF may store this indication or parameter. The P-CSCF may for example store the "auth-type=digest" parameter implicitly within the Service-Route header received within the 200 OK response being responsive to the registration request, or the P-CSCF may for example store this information explicitly with the registration data.

If the P-CSCF forwards a session initiating or standalone SIP request using a stored Service-Route header to the S-CSCF, the P-CSCF may not copy the "auth-type=digest" parameter to the Service-Route header.

In view of the foregoing, an user authentication type determination may be accomplished by checking whether or not a stored authentication type parameter is present, i.e. is stored, for example in registration date being retrieved upon receipt of a SIP INVITE message (possibly containing a SDP offer). For example, it may be checked whether a Service-Route header retrieved from stored registration data of the requesting user contains the "auth-type=digest" parameter. If it is present, the executing apparatus knows that the requesting user has HTTP digest authentication type/scheme requiring the inclusion of a Proxy-Authorization header in the SIP INVITE message.

It is to be noted that the above example is based on the usage of a parameter indicating a specific authentication type of a user e.g. at the P-CSCF. Such a parameter may equally well be transferred e.g. from S-CSCF to P-CSCF in any conceivable message (e.g. 200 OK), any conceivable header (e.g. a SIP header), or the like, and may be arbitrarily denoted and/or formed. The format used herein, i.e. "auth-type=digest" is only exemplary and illustrative. As described above, additionally or alternatively to the mentioned parameter there may be used an indication of a required challenging of the user (or the type of user) for authentication, e.g. comprising a need for such a challenging and/or particulars (e.g. parameters) thereof. Accordingly, the format of a parameter indicating a specific authentication type of a user may for example be like "auth-type=challenging" or "auth-type=challenging, challenge=Proxy-Auth" in addition to or instead of "auth-type=digest", for example. Stated in other words, it is inessential for embodiments of the present invention how such an authentication type parameter is built and/or transferred.

Figure 5:
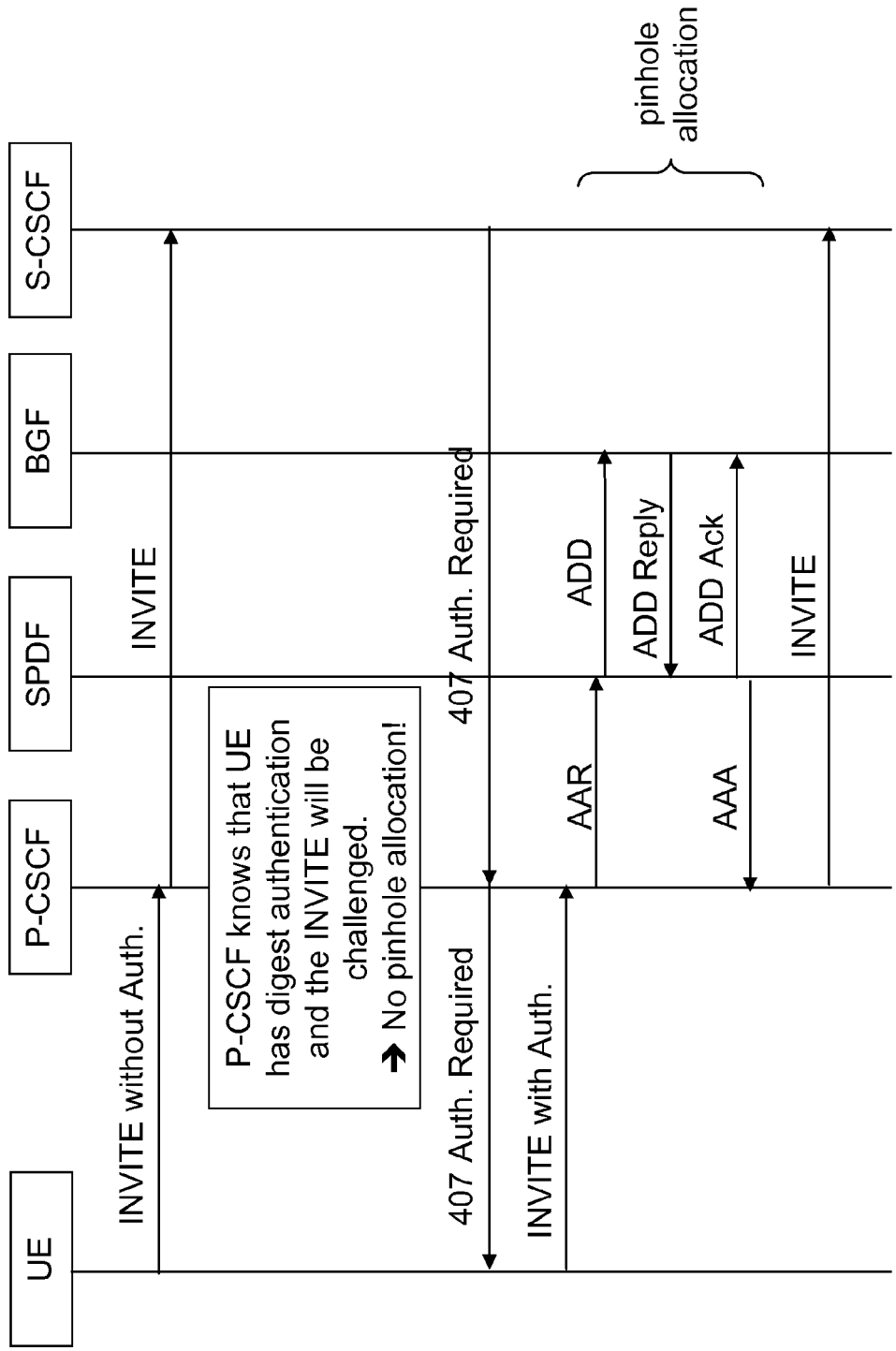
FIG. 5 shows a signaling diagram of a session initiation call with failed authentication according to exemplary embodiments of the present invention.

In an operation of detecting an absence of authentication data required for a proper authentication according to the user's authentication type, for example a received SIP INVITE message may be searched for a Proxy-Authorization header in case the user's authentication type/scheme is HTTP digest. If present, an ordinary resource reservation procedure for the requested session may be initiated, such as depicted in the second pinhole allocation procedure according to FIG. 3. If not present, the procedure proceeds as depicted in FIG. 5.

By virtue of authentication type determination and authentication data (absence) detection, the executing apparatus such as e.g. a P-CSCF of an IMS system may predetermine whether a session initiation element such as e.g. a S-CSCF of the IMS system will accept or refuse the session and, if refused, will request authentication of the user.

In an operation of preventing resource reservation for the requested session initiation, i.e. the requested session, when a refusal of the requested session e.g. by a S-CSCF is predetermined (for example due to the absence of a Proxy-Authorization header in a SIP INVITE message of a user having HTTP digest authentication), a superfluous message exchange for resource reservation may be avoided. Namely, the P-CSCF may skip an ordinary resource reservation procedure e.g. with SPDF and BGF, i.e. a pinhole allocation in the BGF may be avoided.

For example, if the above-specified "auth-type=digest" parameter is present, the session initiation request does not include the Proxy-Authorization header and resource reservation improvement/optimization according to embodiments of the present invention is enabled, the P-CSCF skips the Gq' interface session initiation procedure for the resources reservation. Further, the P-CSCF may replace the present connection IP address in the SIP INVITE message with 0.0.0.0 or 0::0 (in dependence from the used IP version v4 or v6 in the IMS core), which may e.g. reside in the c= line of the SDP offer, and the P-CSCF may forward the thus modified SIP INVITE message to the S-CSCF. The replacement of the connection IP address with the "on-hold" address is to avoid the routing to the (private) address inserted by the client/user (i.e. the address where the offerer is listening), in case of an unforeseen error. In case of symmetric media transport, the address in question, e.g. the address in the c= line of the SDP offer, may be the source address of the requesting user equipment. When this address is (set to) 0.0.0.0 or 0::0, the user equipment is not listening.

The P-CSCF may also mark the resource reservation improvement/optimization in transaction data, i.e. data regarding transactions in connection with session initiation.

As a response to the forwarded session initiation request from the P-CSCF to the S-CSCF, the P-CSCF may receive a session initiation response from the S-CSCF, which may contain a session description, for example by means of a SDP answer.

If the P-CSCF receives a response on the Mw interface carrying an SDP answer to an initial INVITE request, the P-CSCF checks in the transaction data, whether it resource reservation improvement/optimization according to embodiments of the present invention has been applied for this INVITE request. This may be accomplished by checking whether or not a respective mark is set.

Figure 1:
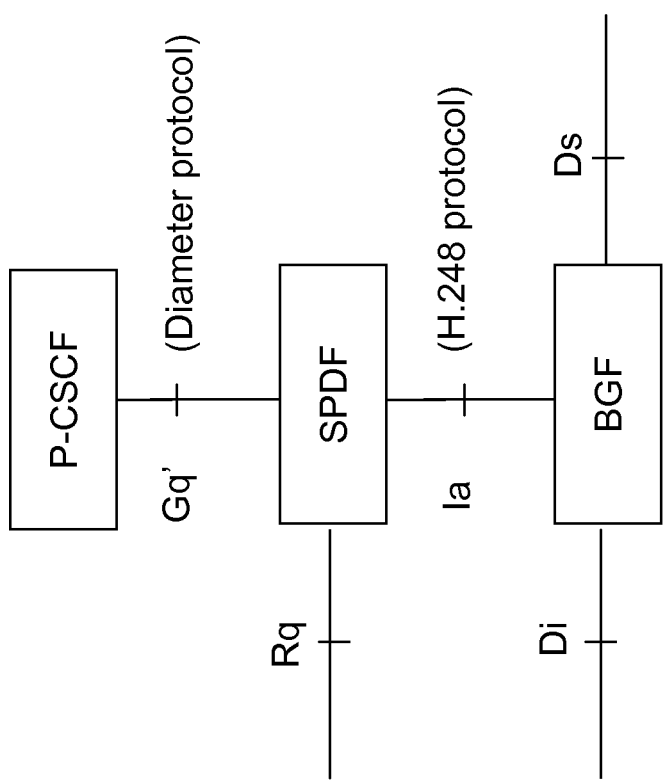
FIG. 1 shows a schematic block diagram of a logical architectures and interfaces of a (decomposed) session border control functionality according to TIPSAN.
Figure 2:
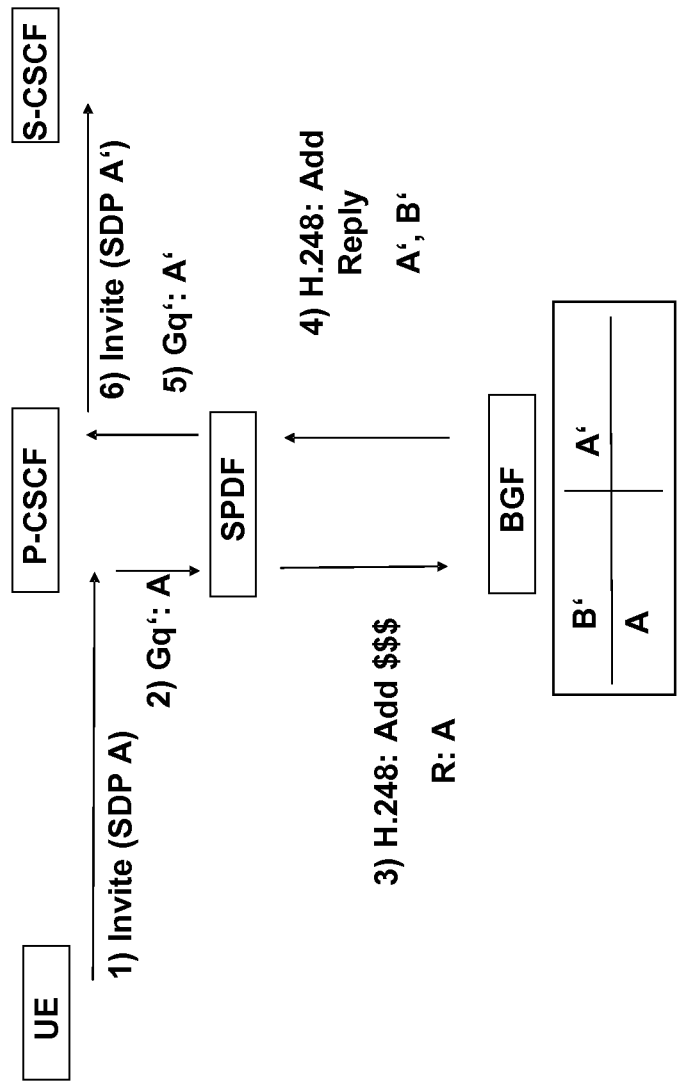
FIG. 2 shows a schematic illustration of a call flow for session initiation in the logical architecture of FIG. 1.
Figure 3:
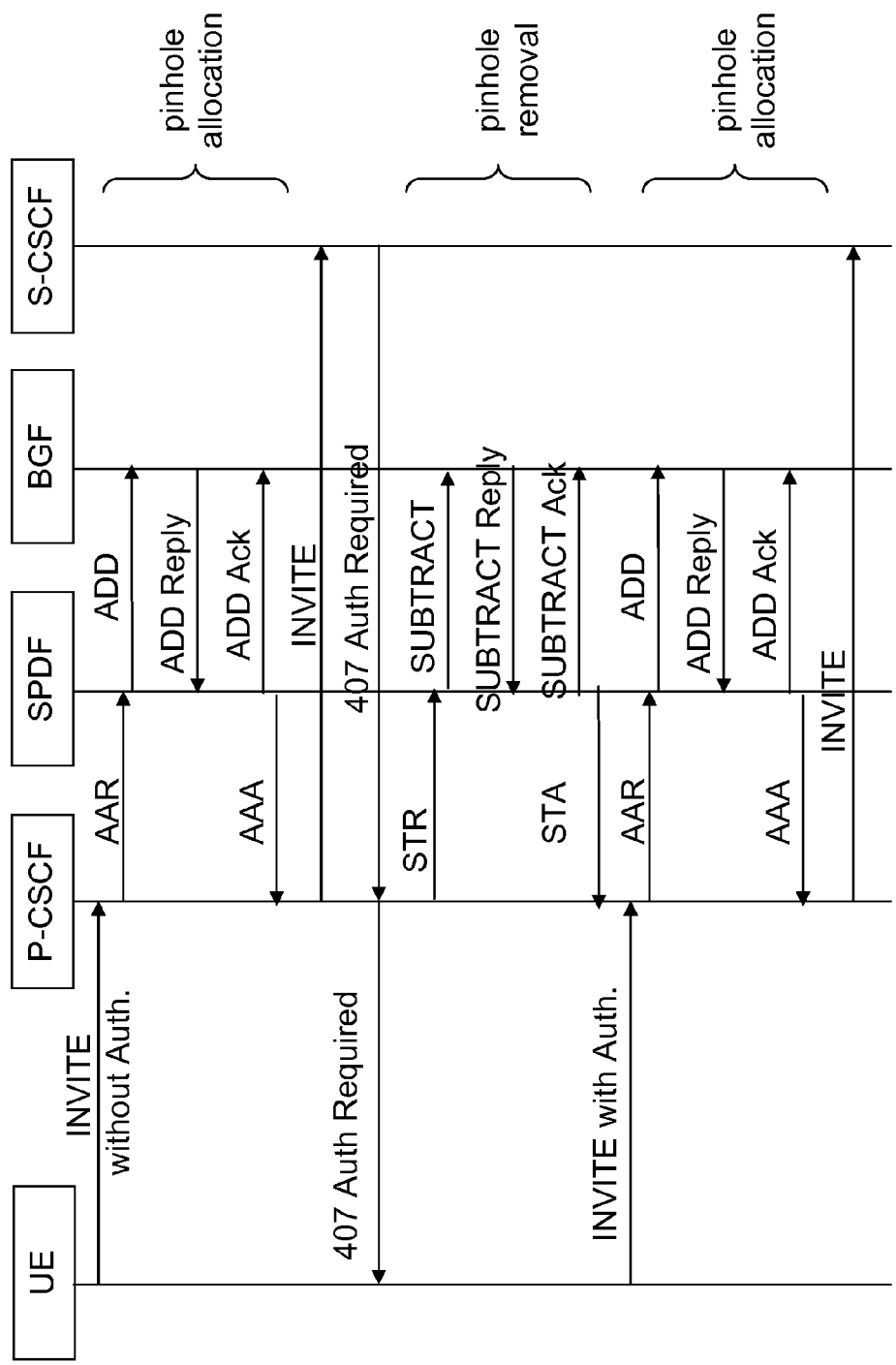
FIG. 3 shows a signaling diagram of a session initiation call with failed authentication.

If resource reservation improvement/optimization according to embodiments of the present invention has not been applied, an ordinary procedure will be performed, such as indicated by FIG. 3 above.

If resource reservation improvement/optimization according to embodiments of the present invention has been applied, the type of response is to be discriminated.

If the response is negative, for example a "407 Auth Required" or any other negative response, the P-CSCF needs not to release any reserved resources in SPDF and BGF, since there is no matching Gq' session, thus needs not to terminate it. The P-CSCF may forward the response to the user equipment UE together with the authentication/authorization challenge.

If the response is positive, for example a provisional response (excluded 100 Trying) or 200 OK, the P-CSCF may forward the response to the user equipment UE, and may additionally initiate a network-initiated session release, as the resources are not correctly reserved for the session. However, this case may not happen in a properly configured IMS system and/or network environment.

In summary, according to exemplary embodiments of the present invention, a first access point in a service provisioning system, i.e. a proxy, e.g. the P-CSCF in an IMS system, knows whether the user has a specific authentication type/scheme, e.g. HTTP digest. When receiving a session initiation request, e.g. an initial INVITE, from a user having this authentication type/scheme, e.g. HTTP digest, and there is no (required) authentication information, e.g. a Proxy-Authorization header, in the INVITE message, then the P-CSCF can predetermine that a session initiation element, e.g. a S-CSCF, will refuse the session and will request authentication. The P-CSCF will skip the Gq' session initiation and this will save superfluous allocation and removal of gateway resources, e.g. BGF pinhole(s).

FIG. 5 shows a signaling diagram of a session initiation call with failed authentication according to exemplary embodiments of the present invention. The signaling diagram according to FIG. 5 results from an implementation of a method according to exemplary embodiment of the present invention at the P-CSCF, such as depicted in FIG. 4.

Similar to FIG. 3, the P-CSCF receives an initial SIP INVITE message without authentication data or credentials, in the case of HTTP digest without a Proxy-Authorization header. Instead of initiating a resource reservation (pinhole allocation) with SPDF and BGF (for example Core Border Gateway Function C-BGF), the P-CSCF prevents such a knowingly superfluous message exchange, but merely forwards the SIP INVITE message (with a modified connection address) to the S-CSCF. Such beneficial behavior is possible due to the P-CSCF's knowledge about the user's authentication type and the presence or absence of corresponding authentication data or credentials in the session initiation request, in the exemplary case the use of HTTP digest authentication and the absence of a Proxy-Authorization header. Upon receipt of a negative response in the form of a "407 Auth Required" message from the S-CSCF, the P-CSCF forwards this message including an authentication/authorization challenge to the user equipment UE, which accordingly resends another session initiation request containing the required authentication data or credentials, in the exemplary case a Proxy-Authorization header. Then, the session initiation procedure may proceed in an ordinary manner as depicted in the bottom part of FIG. 3. That is, resources (pinholes) for the requested session may be successfully reserved (allocated).

As mentioned above, the illustrated procedure according to FIG. 5 relates to a SBC implementation according to TISPAN. In a SBC implementation according to 3GPP, there is no SPDF entity, but the P-CSCF (realizing the SBC functionality) directly controls the border gateway A-BGF without an intermediate SPDF.

From FIG. 5 it is evident that—while the underlying assumption is the same as for FIG. 3, i.e. a failed initial authentication trial—only 5 (instead of 15) messages are to be exchanged within the logical integrated session border control function, i.e. between P-CSCF, SPDF and BGF in case of a TISPAN implementation, or between P-CSCF and A-BGF in case of a 3GPP implementation.

Such improvement/optimization of the signaling is effective in avoiding multiple pinhole resource allocations and removals. It is estimated that a performance improvement of about 25% to 40% can be reached, if the pinhole resources are allocated only one time, depending on the used traffic model, and the proportion of the IMS internal traffic. This may mean a reduction of the necessary S-/PDF and respectively C-/BGF boxes by 25 to 40% in an IMS implementation.

According to exemplary embodiments of the present invention as described herein, the P-CSCF (or another equivalent node or entity) may be able to decide about the skipping of resource reservation based on a stored authentication type and a presence or absence of authentication data in a request. The P-CSCF may also inform downstream nodes or entities performing similar reservations for the media stream in order to enable them to skip the resource reservation as well. An example of such use case may be a roaming scenario, where the P-CSCF (or another equivalent node or entity) is located in a visited network and an initial request will pass two or more network borders before reaching a home network where a registrar (e.g. a S-CSCF or the like) is located. On each, visited and home network border an IBCF (Interconnection Border Control Function) or the like may be responsible for a resource reservation for the requested media stream in the I-BGF (Interconnection Border Gateway Function) or the like. There may also be transit networks between the visited and home networks, borders of which may also be protected by IBCFs and I-BGFs. In case of a challenging, all such reserved pinholes should be released as well according to conventional techniques. The IBCFs are not registration stateful, they are not able to store a confirmation of challenging (i.e. authentication type). Therefore, the P-CSCF may signalize in the down-stream direction the decision about the resource optimization as described above. This may happen e.g. using an SDP attribute line (to avoid extension to SIP). These intermediate nodes may decide upon the reception of this information, if understood, not to allocate the pinhole in the controlled border gateways. The intermediate nodes, like IBCFs, may omit the NISR (network-initiated session release) processing in case of a failure, as the P-CSCF, which has informed them about the decision, will perform the NISR.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 6, while for the sake of brevity reference is made to the detailed description of respective corresponding methods and operations according to FIGS. 4 and 5, respectively.

Figure 6:
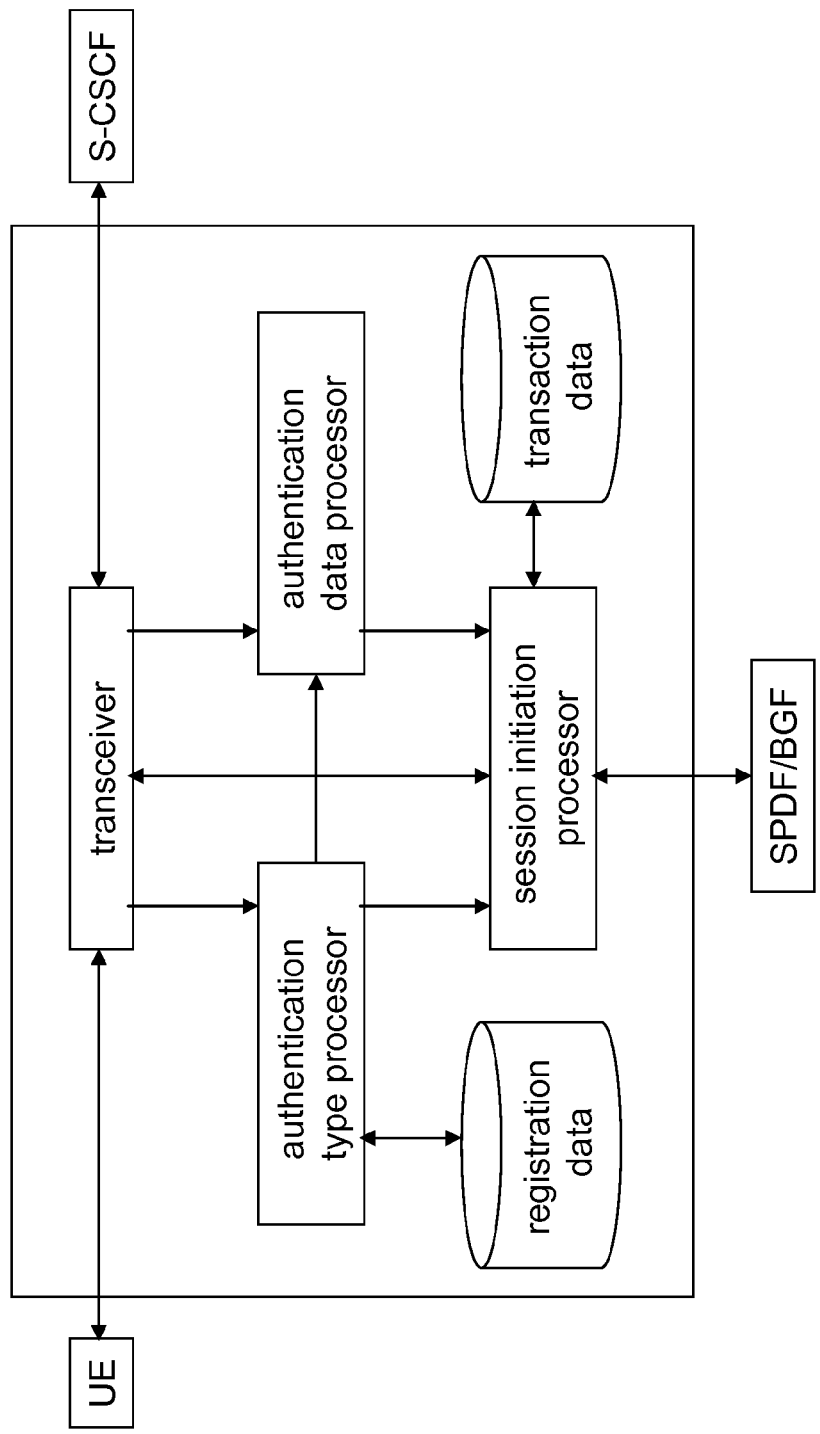
FIG. 6 shows a schematic block diagram of an apparatus according to exemplary embodiments of the present invention.

In FIG. 6 below, the solid line blocks are basically configured to perform respective operations as described above. The entirety of solid line blocks are basically configured to perform the methods and operations as described above, respectively. With respect to FIG. 6, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows interconnecting individual blocks are meant to illustrate an operational coupling there-between, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 6, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like.

FIG. 6 shows a schematic block diagram of an apparatus according to exemplary embodiments of the present invention. The thus depicted apparatus may be implemented by or at a first access point of a requesting user in a service provisioning system, i.e. a proxy, for example a P-CSCF element in an IMS system.

According to FIG. 6, the apparatus according to embodiments of the present invention may have interfaces to a user equipment UE, a S-CSCF representing a session initiation element and elements representing constituents of an integrated session border control function, i.e. SPDF and BGF.

A system according to embodiments of the present invention may comprise any conceivable combination of the thus depicted elements. For example, a system according to embodiments of the present invention may comprise the apparatus (i.e. a P-CSCF element) and a S-CSCF element, or may comprise the apparatus (i.e. a P-CSCF element), a SPDF element and a BGF element, or may comprise the apparatus (i.e. a P-CSCF element), a S-CSCF element, a SPDF element and a BGF element.

According to an exemplary embodiment depicted in FIG. 6, the thus depicted apparatus comprises a transceiver, an authentication type processor, an authentication data processor, a session initiation processor and memories for registration data, i.e. data regarding a user registration, and transaction data, i.e. data regarding transactions in connection with session initiation. The three depicted processors may be implemented by a single processor encompassing the individual functions of the three depicted processors.

As depicted in FIG. 6, an apparatus according to exemplary embodiments of the present invention comprises a transceiver configured to receive a session initiation request of a user, an authentication type processor configured to determine an authentication type of the user, an authentication data processor configured to detect, in the received session initiation request, an absence of authentication data required for an authentication in accordance with the determined authentication type of the user, and a session initiation processor configured to prevent a resource reservation for the requested session initiation.

Referring to the above examples relating to the use of SIP/SDP messages and assuming a user having a HTTP digest authentication type/scheme requiring a Proxy-Authorization header, the thus depicted functional units may be configured to perform the following operations.

The transceiver according to FIG. 6 may be configured to receive a registration request REGISTER from the user equipment, to receive a session initiation request SIP INVITE from the user equipment UE, to send a session initiation response 407 AUTH REQUIRED, 200 OK or the like to the user equipment. It may further be configured to receive an authentication type parameter (e.g. in a 200 OK message) from the S-CSCF, to send a modified session initiation request SIP INVITE to the S-CSCF, and to receive a session initiation response 407 AUTH REQUIRED, 200 OK or the like from the S-CSCF.

The authentication type processor according to FIG. 5 may be configured to receive, from the transceiver, a received authentication type parameter and to store this parameter in conjunction with registration data of the respective user (e.g. in a corresponding memory). It may further check the presence or absence of such a parameter in registration data when being retrieved for session initiation and/or authentication/authorization purposes. It may further be configured to indicate the authentication type of a requesting user, i.e. a result of authentication type determination, to the session initiation processor and the authentication data processor.

The authentication data processor according to FIG. 6 may be configured to receive, from the transceiver, a received session initiation request so as to search for required authentication data or credentials for a certain authentication type of a user having been indicated by the authentication type processor. It may further be configured to indicate the presence or absence of authentication data or credentials of a requesting user, i.e. a result of authentication data detection, to the session initiation processor.

The session initiation processor according to FIG. 6 may be configured to receive indications about authentication type and the presence or absence of respective required authentication data or credentials form the respective processors, and to decide about the prospects of a successful authentication in the requested session initiation based thereon. If the prospects are decided to be good, the session initiation processor may be configured to perform resource reservation in cooperation with SPDF/BGF. If the prospects are bad, the session initiation processor may be configured to prevent such a resource reservation, i.e. to kip a corresponding Gq' procedure, i.e. to perform a resource reservation improvement/optimization according to embodiments of the present invention. In this regard, it may be configured to replace a connection address in the SIP INVITE message into an "on-hold" address and to forward the thus modified SIP INVITE message to the S-CSCSF via the transceiver, as well as to receive a session initiation response from the S-CSCF via the transceiver and to act accordingly, namely to forward it together with the authentication challenge to the user equipment UE via the transceiver or to initiate a network-initiated session release procedure. Further, it may be configured to mark the application of resource reservation improvement/optimization according to embodiments of the present invention in transaction data for the present session initiation (e.g. in a corresponding memory) and to read such a mark accordingly.

According to another example, referring to FIG. 6, a transceiver may represent means for receiving a session initiation request of a user, and may also represent means for forwarding the session initiation request with a null connection address to a session initiation element, for receiving an authentication type parameter indicating a specific authentication type in a session registration message from a session initiation element, and for receiving, responsive to the session initiation request, a session initiation response from a session initiation element, an authentication type processor may represent means for determining an authentication type of the user, and may also represent means for storing an authentication type parameter indicating a specific authentication type in conjunction with user registration data of the user and checking, when retrieving the user registration data of the user, whether or not the authentication type parameter is present, an authentication data processor may represent means for detecting, in the received session initiation request, an absence of authentication data required for an authentication in accordance with the determined authentication type of the user, and a session initiation processor may represent means for preventing a resource reservation for the requested session initiation, and may also represent means for replacing a connection address in the session initiation request with a null address, for skipping a resource reservation procedure with a gateway function, for allocating and/or removing traffic pinholes at said gateway function, and for initiating a session release procedure, when a received session initiation response is positive, or forwarding a received session initiation response together with an authentication challenge to the user, when a received session initiation response is negative.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions for performing the respective functions, as well as software (or a computer program or a computer program product) embodied on a tangible medium such as a computer-readable storage medium having stored thereon a respective data structure or code means/portions or embodied in a signal or in a chip, potentially during processing thereof.

Generally, for the purpose of the present invention as described herein above, it should be noted that method steps and functions likely to be implemented as software code portions and being run using a processor at one of the entities, a network element, or a terminal (as examples of devices, apparatuses and/or modules thereof, or as examples of entities including apparatuses and/or modules therefor), are software code independent and can be specified using any known or future developed programming language, such as e.g. Java, C++, C, and Assembler, as long as the functionality defined by the method steps is preserved;

generally, any method step is suitable to be implemented as software or by hardware without changing the idea of the invention in terms of the functionality implemented;

method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

There are provided measures for resource reservation improvement in session initiation. Such measures for resource reservation improvement may for example comprise receiving a session initiation request of a user, determining an authentication type of the user, detecting, in the received session initiation request, an absence of authentication data required for an authentication in accordance with the determined authentication type of the user, and preventing a resource reservation for the requested session initiation.

Even though the invention is described above with reference to the examples according to the accompanying drawings, it is to be understood that the invention is not restricted thereto. Rather, it is apparent to a skilled person that the present invention can be modified in many ways without departing from the scope of the inventive idea as disclosed herein.

The invention claimed is:

1. A method comprising
receiving a session initiation request of a user,
determining an authentication type of the user, comprising,
 storing an authentication type parameter indicating a specific authentication type in conjunction with user registration data of the user, and
 checking, when retrieving the user registration data of the user, whether or not the authentication type parameter is present,
detecting, in the received session initiation request, an absence of authentication data required for an authentication in accordance with the determined authentication type of the user, and
preventing a resource reservation for the requested session initiation in response to the detected absence of authentication data by predetermining a refusal of the requested session by based on the absence of authentication data and avoiding a superfluous message exchange for resource reservation;
wherein said preventing a resource reservation comprises skipping a resource reservation procedure with a gateway function; and
wherein said resource reservation comprises allocating and/or removing traffic pinholes at said gateway function.

2. The method according to claim 1, further comprising
replacing a connection address in the session initiation request with a null address, and
forwarding the session initiation request with the null address to a session initiation element.

3. The method according to claim 1, further comprising
receiving the authentication type parameter indicating a specific authentication type in a session registration message from a session initiation element.

4. The method according to claim 1, further comprising
receiving, responsive to the session initiation request, a session initiation response from a session initiation element, and
initiating a session release procedure, when the received session initiation response is positive, or forwarding the received session initiation response together with an authentication challenge to the user, when the received session initiation response is negative.

5. The method according to claim 1, wherein said session initiation request comprises an invite message in accordance with a session initiation protocol with or without session description information in accordance with a session description protocol.

6. The method according to claim 1, wherein, when the authentication type is determined to be HTTP digest authentication or a user challenging using a Proxy-Authorization header, the authentication data to be detected is a Proxy-Authorization header in the session initiation request.

7. The method according to claim 1, wherein said user is a client of an IP multimedia subsystem requesting a session towards said IP multimedia subsystem.

8. The method according to claim 1, wherein said method is operable at a proxy call state control function of an IP multimedia subsystem.

9. A computer program product comprising program code means being arranged, when run on a processor of an apparatus, to perform the method according to claim 1.

10. The computer program product according to claim 9, said apparatus being operable as a proxy call state control function of an IP multimedia subsystem.

11. An apparatus, comprising:
one or more processors; and
one or more memories including computer program code,
the one or more memories and the computer program code configured, with the one or more processors, to cause the apparatus to perform at least the following:
receive a session initiation request of a user,
determine an authentication type of the user, by storing an authentication type parameter indicating a specific authentication type in conjunction with user registration data of the user and checking, when retrieving the user registration data of the user, whether or not the authentication type parameter is present,
detect, in the received session initiation request, an absence of authentication data required for an authentication in accordance with the determined authentication type of the user, and
prevent a resource reservation for the requested session initiation in response to the detected absence of authentication data by predetermining a refusal of the requested session based on the absence of authentication data and avoiding a superfluous message exchange for resource reservation;
wherein preventing a resource reservation comprises skipping a resource reservation procedure with a gateway function; and
wherein said resource reservation comprises allocating and/or removing traffic pinholes at said gateway function.

12. The apparatus according to claim 11, wherein
the one or more memories and the computer program code is configured, with the one or more processors, to cause the apparatus to replace a connection address in the session initiation request with a null address, and
a transceiver is configured to forward the session initiation request with the null address to a session initiation element.

13. The apparatus according to claim 11, wherein the one or more memories and the computer program code is configured, with the one or more processors, to cause the apparatus to skip a resource reservation procedure with a gateway function.

14. The apparatus according to claim 11, wherein an authentication type processor is configured to
store an authentication type parameter indicating a specific authentication type in conjunction with user registration data of the user, and
check, when retrieving the user registration data of the user, whether or not the authentication type parameter is present.

15. The apparatus according to claim 14, wherein a transceiver is configured to receive the authentication type parameter indicating a specific authentication type in a session registration message from a session initiation element.

16. The apparatus according to claim 11, wherein
a transceiver is configured to receive, responsive to the session initiation request, a session initiation response from a session initiation element, and
the one or more memories and the computer program code is configured, with the one or more processors, to cause the apparatus to initiate a session release procedure, when the received session initiation response is positive, or to forward the received session initiation response together with an authentication challenge to the user, when the received session initiation response is negative.

17. The apparatus according to claim 11, wherein said session initiation request comprises an invite message in accordance with a session initiation protocol with or without session description information in accordance with a session description protocol.

18. The apparatus according to claim 11, wherein, when an authentication type processor determines the authentication type to be HTTP digest authentication or a user challenging using a Proxy-Authorization header, an authentication data processor is configured to detect a Proxy-Authorization header in the session initiation request as the authentication data.

19. The apparatus according to claim 11, wherein said user is a client of an IP multimedia subsystem requesting a session towards said IP multimedia subsystem.

20. The apparatus according to claim 11, wherein said apparatus is operable as a proxy call state control function of an IP multimedia subsystem.

21. An apparatus, comprising:
a transceiver configured to receive a session initiation request of a user,
an authentication type processor configured to determine an authentication type of the user,
an authentication data processor configured to detect, in the received session initiation request, an absence of authentication data required for an authentication in accordance with the determined authentication type of the user, and
a processor and a memory including computer program code configured to prevent a resource reservation for the requested session initiation in response to the detected absence of authentication data by predetermining a refusal of the requested session based on the absence of authentication data and avoiding a superfluous message exchange for resource reservation,
wherein the session initiation processor is configured to skip a resource reservation procedure with a gateway function, said resource reservation comprising allocating and/or removing traffic pinholes at said gateway function, and
wherein determination of the authentication type of the user comprises storing an authentication type parameter indicating a specific authentication type in conjunction with user registration data of the user and checking, when retrieving the user registration data of the user, whether or not the authentication type parameter is present.

* * * * *